June 28, 1955  G. C. ARMSTRONG  2,712,083

THERMAL PROTECTION FOR DYNAMO-ELECTRIC MACHINES

Filed Dec. 6, 1952  3 Sheets-Sheet 1

WITNESSES:
Robert C. Baird
W. C. Groome

INVENTOR
George C. Armstrong, deceased,
by Nano Anna Armstrong, Executrix.
BY
F. P. Lyle
ATTORNEY

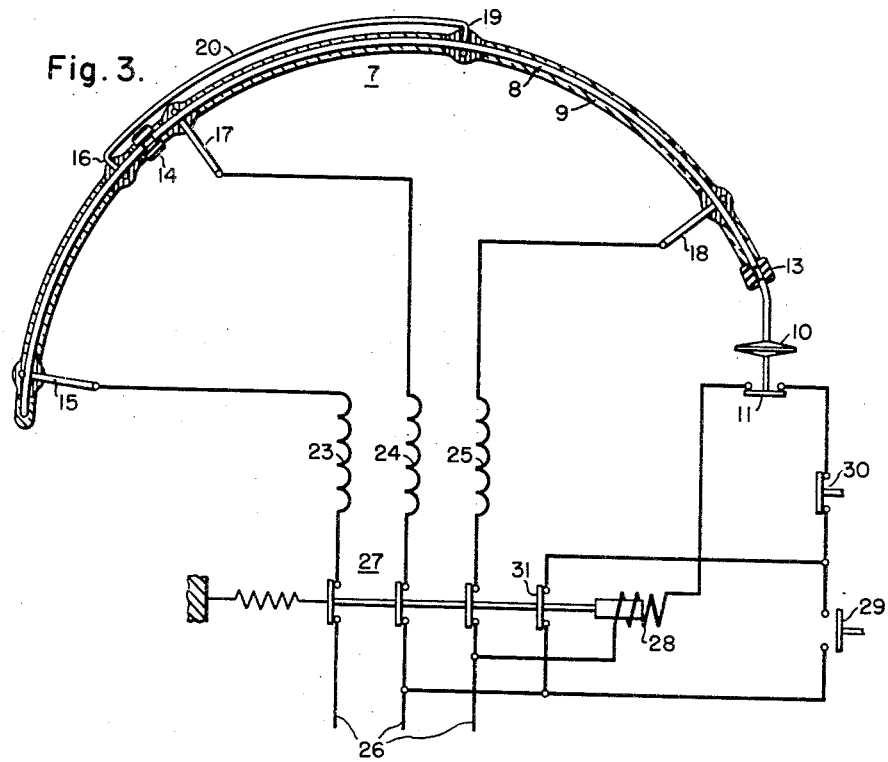
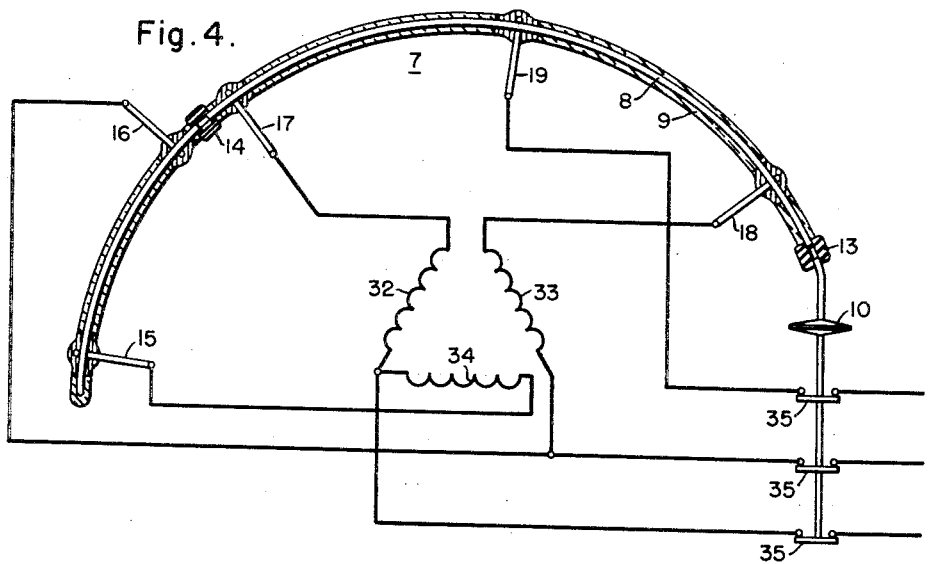

WITNESSES:

INVENTOR
George C. Armstrong, deceased,
by Nano Anna Armstrong, Executrix.
BY

ATTORNEY

United States Patent Office 2,712,083
Patented June 28, 1955

2,712,083

THERMAL PROTECTION FOR DYNAMO-ELECTRIC MACHINES

George C. Armstrong, deceased, late of Amherst, N. Y., by Nano A. Armstrong, executrix, Buffalo, N. Y., assignor to Westinghouse Electric Corporation, East Pittsburgh, Pa., a corporation of Pennsylvania Application December 6, 1952, Serial No. 324,444

15 Claims. (Cl. 310—68)

The present invention relates to the protection of dynamo-electric machines against overheating, and more particularly to inherent thermal protection of polyphase dynamo-electric machines.

Polyphase dynamo-electric machines have usually been protected against overheating by means of thermal overload relays having a thermally-responsive element, usually a bimetallic element, heated either directly by the current of the protected machine or by a heater carrying the current, so that the relay responded solely to the current. Such relays have usually been mounted remote from the machine itself, and frequently in the same inclosure or cabinet as a motor starter or other control equipment. Relays of this type do not give entirely satisfactory or adequate protection, however, since the relay responds only to the current, and the thermal characteristics of the relay do not, and obviously cannot, match those of the motor, so that the thermal response of the relay differs from that of the motor. Thus, the relay is affected differently from the motor by changes in ambient temperature, and the response of the relay may also be affected by heat from other adjacent devices, or by air currents and similar conditions which do not affect the motor. Difficulty in calibration of the relay, and the necessity of a large number of different types and sizes of heaters for different motor designs, also make it difficult to properly apply conventional protective relays and to obtain the desired protection. The conventional relays, therefore, are not satisfactory since it is not possible to obtain sufficiently close protection, and in some circumstances the relay will operate when the motor is still below the maximum safe temperature, so that it is unnecessarily stopped, while under other circumstances the relay may allow the motor to become overheated before it operates.

Inherent thermal protection has been extensively and successfully used in single-phase motors. In this type of protection, a thermally-responsive device, usually a bimetallic element, is mounted directly in or on the motor, so that it responds directly to the motor temperature, and usually is also heated by or in response to the motor current. Very close and effective protection is obtained in this way, but this type of protection has not been applied to three-phase machines because at least two relays would be needed, in order to open two lines, and three relays would be necessary to obtain complete protection under all conditions, since on certain types of external faults a three-phase motor may operate single-phase with excessive current in one phase, so that three relays would be required. The cost and complication of these arrangements has made it impractical to apply this type of protection to three-phase machines. Furthermore, if the relays are mounted in the machine to be as close as possible to the motor windings, so as to follow the temperature changes accurately, they are enclosed in the motor and are not accessible for servicing without partially disassembling the motor. Thus, the conventional inherent thermal protection as used in single-phase motors is not satisfactory for polyphase machines.

The principal object of the present invention is to provide inherent thermal protection for dynamo-electric machines which is suitable for polyphase machines and which will reliably protect against overheating under any condition.

Another object of the invention is to provide inherent thermal protection for polyphase dynamo-electric machines using a relatively simple and inexpensive thermally-responsive device which provides complete protection under all conditions.

A further object of the invention is to provide thermal protection for dynamo-electric machines using a simple thermally-responsive relay device which is mounted in direct thermal relation to the machine windings and is heated by the current, and which can be mounted so that its contacts are accessible from outside the motor.

A still further object of the invention is to provide a thermally-responsive protective relay device comprising a conducting tube containing a vaporizable liquid and arranged to be heated by the current of a protected dynamo-electric machine as well as by direct conduction of heat from the machine windings, so that inherent thermal protection is provided in a simple and relatively inexpensive manner.

Other objects and advantages of the invention will be apparent from the following detailed description, taken in connection with the accompanying drawings, in which:

Figs. 3 and 4 are schematic diagrams showing the connections of the relay to Y and delta-connected motors, respectively.

Figure 1:
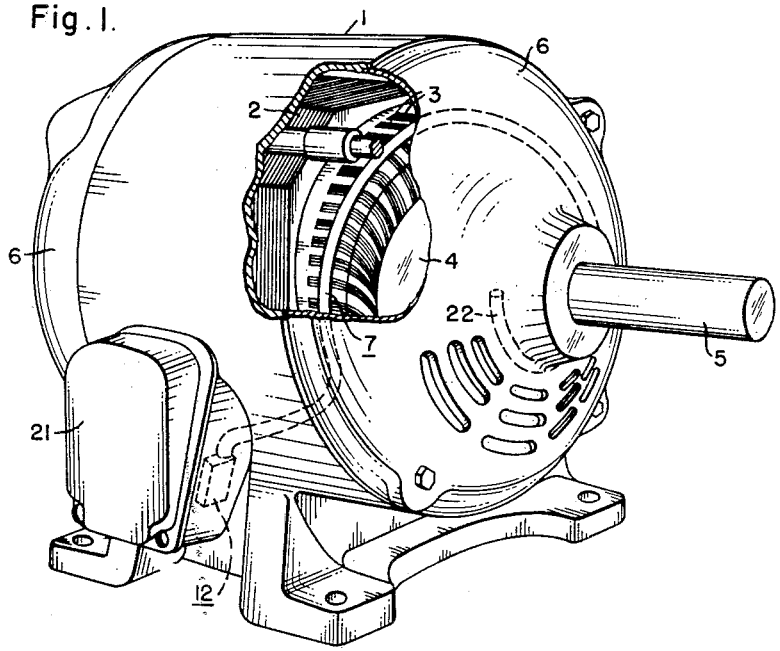
Figure 1 is a perspective view, partly broken away, showing a thermally protected machine.

Fig. 1 shows a thermally-protected electric motor embodying the invention. An alternating-current induction motor has been shown for the purpose of illustration, but it will be understood that the protective means is generally applicable to dynamo-electric machines of any type. The motor shown in Fig. 1 includes a frame structure 1 in which is supported a stator core 2 with windings 3 disposed in slots in the core in the usual manner, with the end turns of the windings extending beyond the core. The motor also has a rotor 4 mounted on a shaft 5 supported for rotation in bearings carried in suitable end brackets 6.

Figure 2:
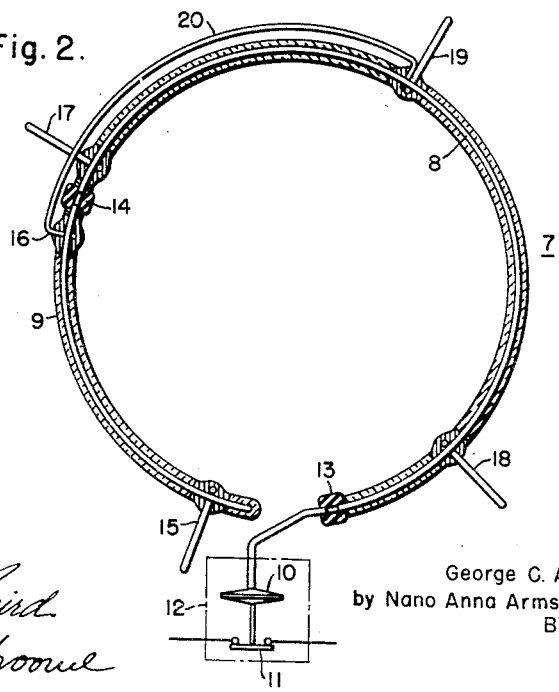
Fig. 2 is a view in elevation showing the thermally-responsive relay device.

The motor is protected against overheating by means of a thermally-responsive relay 7, which is shown more clearly in Fig. 2. As there shown, the relay 7 consists of a length of conductive tubing 8, which is preferably insulated by glass sleeving 9 or other suitable insulating material. The tube 8 is made of a suitable conducting material which is selected to have the proper resistivity to give the desired heating effect on the currents expected in the particular motors on which the relay is to be used. The tube 8 contains a vaporizable liquid which boils at approximately the maximum safe temperature which the machine windings are to be allowed to reach. Any suitable liquid having its boiling point in the desired range may be utilized. For the usual organic insulation, the maximum safe temperature is of the order of 95° C. to 100° C., and a liquid having its boiling point in this range, such as water or propyl alcohol, should be used. If the machine insulation is of a type which can be permitted to reach higher temperatures, a liquid having a higher boiling point can be used. One end of tube 8 is closed and the other end terminates in a bellows device 10 which is arranged to actuate normally closed contacts 11 to open the contacts when the bellows is expanded. It will be seen that when the tube 8 is heated sufficiently to vaporize the liquid in it, the bellows 10 will be expanded and cause the contacts 11 to open. The bellows 10 and contacts 11 are preferably enclosed in a housing 12.

The tube 8 is not continuous but is interrupted by two insulators 13 and 14 which may be made of glass, porcelain, or other suitable material. The insulators 13 and 14, as shown in Fig. 2, are tubular insulators in which the ends of the adjacent sections of the tube 8 are received and held, so that a continuous passage is provided from one end of the tube to the other, but the tube is electrically discontinuous. The insulator 13 is located adjacent the bellows 10, so as to insulate the bellows from the remainder of the tube. The insulator 14 is located so as to divide the tube into two sections of unequal length, the insulator 14 being preferably disposed approximately one-third of the distance from the closed end of the tube to the insulator 13.

Connecting means 15 and 16 are provided adjacent the closed end of the tube 8 and the insulator 14, respectively. These connecting means may be soldered or otherwise joined to the tube 8, and may be of any desired type which will permit electrical connections to be made to the tube. Similar connecting means 17 and 18 are provided adjacent the opposite side of the insulator 14 and the insulator 13, respectively, and a connector 19 is placed substantially half-way between the connectors 17 and 18. The connectors are arranged so as to divide the tube into three sections of approximately equal length and electrical resistance, the section being between the connectors 15 and 16, the connectors 17 and 19, and the connectors 19 and 18. A connecting wire or jumper 20 may also be provided joining the connectors 16 and 19. This wire 20 is needed in some electrical connections of the relay and is omitted in other connections, as will appear hereinafter.

The relay 7 is applied directly to the end turns of the motor winding 3 in the manner shown in Fig. 1. Thus, the tube 8 is wrapped circumferentially around the end turns in direct contact with them, so as to be in close thermal relation to the windings, the conductive tube being electrically insulated from the winding conductors by the winding insulation and the insulation 9 of the relay. The end of the tube with the bellows 10 and contacts 11 extends out through the motor frame and the housing 12 is mounted in the junction box 21, so that it is readily accessible from the outside of the motor. If desired, the other end of the tube within the motor may be bent into contact with the bearing, as indicated at 22, to provide protection against overheating of the bearing. It will be evident that the tube 8 is in close thermal relation with the windings 3, so that its temperature closely follows the temperature of the windings, and when the tube is heated to the boiling point of the liquid in it, the liquid will be vaporized, causing the bellows 10 to expand and open the contacts 11. Thus, the relay 7 operates to open its contacts in response to heating of the windings to a predetermined maximum safe temperature.

Heating of the tube 8 directly by conduction from the motor windings provides adequate protection against overheating caused by overloads and some other conditions, but under stalled or locked-rotor conditions, the windings heat so rapidly that transfer of heat to the tube may not be fast enough to give adequate protection. In order to provide protection under these conditions, the tube 8 is also heated directly by the motor current. Fig. 3 shows the manner in which the tube is electrically connected to the windings of a Y-connected motor. This figure shows a three-phase motor having phase windings 23, 24 and 25 connected to a three-phase line 26 by means of a contactor 27 of any suitable type. The other ends of the windings 23, 24 and 25 are connected to the connectors 15, 17 and 18, respectively, and the connectors 16 and 19 are joined by the wire 20. Each section of the tube 8 is thus connected in series with one of the phase windings to carry the phase current, and all three sections are connected to the connector 19 which forms the neutral point.

The contacts 11 of the relay 7 may be connected in the control circuit of the motor in any desired manner. As shown in the drawing, the contactor 27 is actuated by a coil 28 connected across one phase of the line 26 and controlled by a start pushbutton 29 and a stop pushbutton 30. The motor is started by momentarily closing the start button 29, which energizes the coil 28 and closes the contactor 27, the contactor being held in by a sealing contact 31. The motor is stopped by opening of the contacts 11 or by actuation of the stop pushbutton 30, either of which interrupts the circuit of the coil 28 and allows the contactor 27 to open.

It will be seen that the motor will be stopped upon heating of the tube 8 to the predetermined maximum safe temperature either by direct conduction of heat from the windings or by heating by the current flowing through the three sections of the tube. Complete protection is obtained in this way under all conditions. Thus, heating due to an overload causes the winding temperature to rise and heats the tube 8 directly. Stalled or lock-rotor conditions cause excessive currents in the windings, which flow through the sections of the tube and heat it rapidly enough to cause operation in time to protect the motor. Protection is also obtained against single-phase operation of the motor. Such operation may be caused by interruption of one of the lines 26 external to the motor, which will result in the motor running as a single-phase motor with two of the phase windings in series across the remaining two lines, with excessive currents. Single-phase operation may also result from blowing of a fuse on the primary side of a three-phase transformer supplying the motor. Current will then flow through two of the phase windings in parallel and return through the third phase, which will thus be carrying an excessive current. Since each section of the tube carries the current of one of the phase windings, the tube will be heated sufficiently to cause operation by excessive current in any phase and complete protection is provided under either of these conditions.

Fig. 4 shows the manner of connecting the relay 7 to a delta-connected motor having three phase windings 32, 33 and 34. The windings 32 and 34 are connected at one end to each other and to the line, and the other ends of these windings are connected to the connectors 17 and 15, respectively, of the relay. One end of the winding 33 is connected to the connector 18 and the other end is connected to the line and to the connector 16, the wire 20 being omitted in this connection. The connector 19 is connected to the third line. It will be seen from Fig. 4 that this results in the three windings being connected in delta with one section of the tube 8 in series with each phase winding, so that full and complete protection is obtained, under all conditions, in the same manner described above in connection with Fig. 3. In Fig. 4, the bellows 10 is shown as actuating multiple contacts 35, instead of the single contact previously described, the contacts 35 being connected directly in the supply line so that operation of the relay opens the line directly. It will be understood that in either of the connections of Fig. 3 or 4, multiple contacts might be used in the manner shown in Fig. 4, or a single contact might be connected in a control circuit as shown in Fig. 3, depending upon the size of the motor and the magnitude of the currents to be interrupted.

Figure 5:
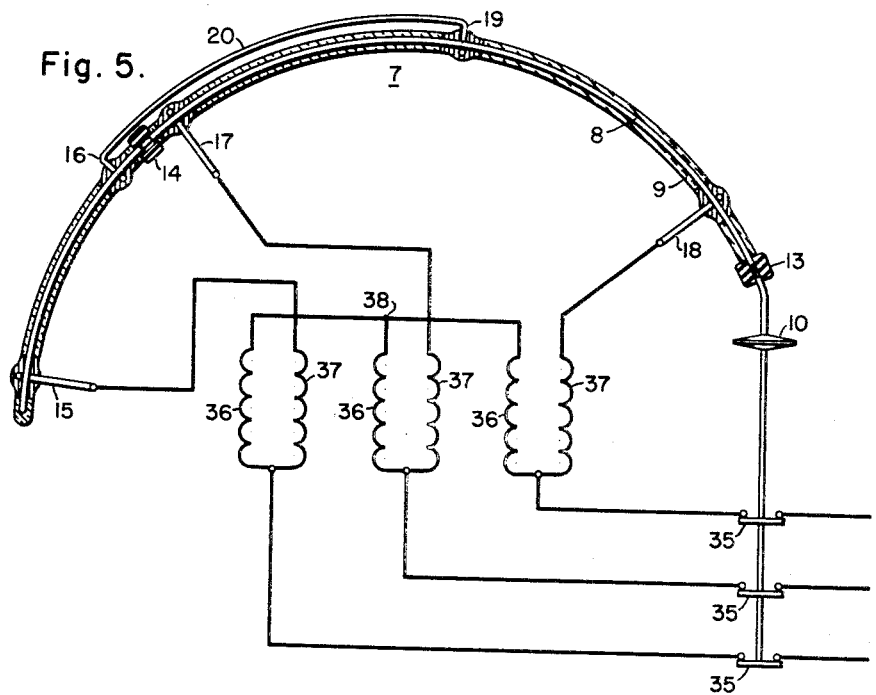
Figs. 5 and 6 are similar diagrams showing the connections of the relay to dual-voltage Y and delta connected motors, respectively.

The relay 7 is usable with dual-voltage motors as well as with single-voltage motors and can readily be connected so that the usual standard connections of these motors may be used without change. Dual-voltage motors are provided with windings which have two sections in each phase, the sections of each phase being connected in series for operation on the higher voltage and in parallel for operation on the lower voltage. In applying the relay 7 to a Y-connected dual-voltage motor, the connections are made as shown in Fig. 5, which corresponds to Fig. 3. As shown in Fig. 5, for the low-voltage connection, one section 37 of each of the three phases is connected to the relay in the same manner as the winding shown in Fig. 3, and the other sections 36 of each phase are connected in Y to a neutral point 38, so that the two sections of each phase are in parallel, with a section of the tube 8 in series with one section of each phase winding. For high-voltage operation the two sections 36 and 37 of each phase are connected in series and connected to the relay 7 in exactly the same manner as in Fig. 3. It will be apparent that protection is provided in this way in the same manner previously described, since the tube 8 will carry the same currents in each connection and the same relay is, therefore, usable for both high and low voltage connections.

Figure 6:
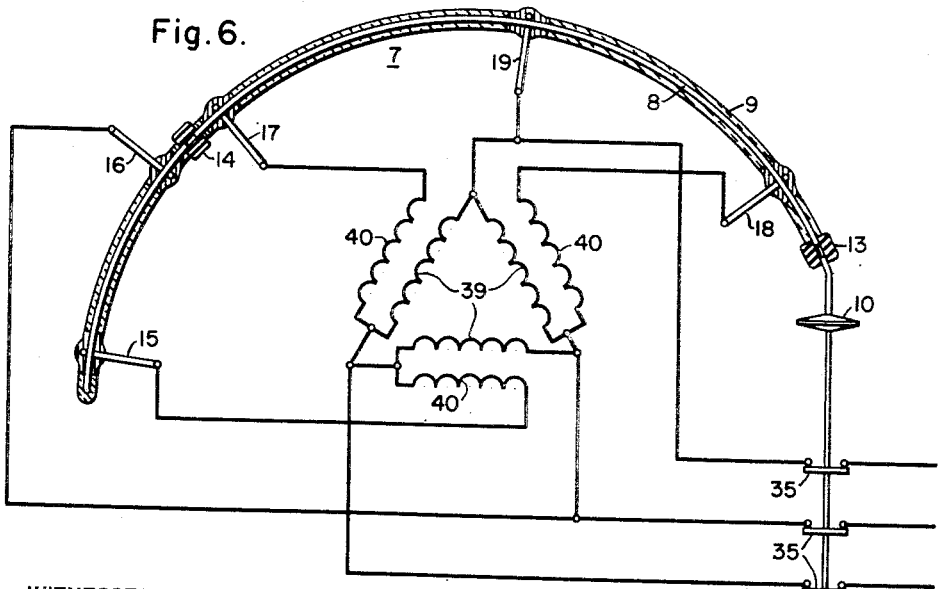

Fig. 6 corresponds to Fig. 4 and shows the low-voltage connection for a dual-voltage delta-connected machine. In this connection, one section 39 of each phase is connected in delta to the corresponding sections of the other phases and to the line. One end of each section 40 of each phase is connected to the relay 7, in the same manner as in Fig. 4, and the other end of each section 40 is connected to the corresponding section 39. It will be evident from the drawings that each phase consists of two paralleled sections with a section of the tube 8 in series with one section. For the high-voltage delta connection, the winding sections 39 and 40 of each phase are connected in series, and the connections to the relay 7 are made in the manner shown in Fig. 4. Thus, the relay is applicable to dual-voltage motors, either Y or delta connected, in a simple manner which makes it possible to use the standard connections for motors of this type.

It should now be apparent that inherent thermal protection has been provided by means of a relatively simple and inexpensive thermally-responsive relay which is applicable to polyphase motors to provide complete protection under all conditions. The thermally-responsive relay is readily applied to the end turns of the winding and may be put in place before the final varnish impregnation and baking of the winding, if desired, so that the varnish helps to hold it in place and in good thermal relation with the windings. The bellows and contact assembly of the relay extend outside the motor frame and are readily accessible so that the contacts may be serviced easily without disassembling the motor.

Various modifications are, of course, possible within the scope of the invention. Thus, the tube 8 might be heated by heater wires wrapped around the tube, or carried into the tube by insulating connections, and connected to the motor windings in the manner shown, although these arrangements are probably less desirable than that shown because of the resulting increased size and the greater heating effect needed. The insulator 13 is necessary since the bellows 10 is mounted on the motor frame at ground potential and must, therefore, be insulated from the neutral point of a Y connected winding, which is not necessarily at ground potential. If the bellows 10 were insulated from ground, however, the insulator 13 could be omitted.

Certain preferred embodiments of the invention have been shown and described for the purpose of illustration, but since various other embodiments and modifications are possible within the scope of the invention, it is to be understood that the invention is not limited to the specific details or constructions shown, but in its broadest aspects it includes all equivalent embodiments and modifications.

It is claimed:

1. In combination, a polyphase electric motor, a thermally-responsive device comprising a tube containing a vaporizable liquid, said thermally-responsive device being disposed in close thermal relation to the motor, means for heating different portions of the tube in accordance with the currents in the different phases of the motor, and means for effecting deenergization of the motor in response to vaporization of the liquid in the tube.

2. In combination, a polyphase electric motor having a plurality of phase windings, a thermally-responsive device comprising a tube containing a vaporizable liquid, said thermally-responsive device being disposed in close thermal relation to the motor windings, means for heating different portions of the tube in accordance with the currents in the different phases of the motor, and means for effecting deenergization of the motor in response to vaporization of the liquid in the tube.

3. A dynamo-electric machine having a stator member and a rotor member, the stator member including a core and windings on the core, the windings having end portions extending beyond the core, a tube containing a vaporizable liquid, said tube extending circumferentially of the machine and engaging the end portions of the windings in close thermal relation, and means accessible from the outside of the machine for effecting deenergization of the machine in response to vaporization of the liquid in the tube.

4. A dynamo-electric machine having a stator member and a rotor member, the stator member including a core and windings on the core, the windings having end portions extending beyond the core, a tube containing a vaporizable liquid, said tube extending circumferentially of the machine and engaging the end portions of the windings in close thermal relation, means for heating the tube in accordance with the currents in the windings, and means accessible from the outside of the machine for effecting deenergization of the machine in response to vaporization of the liquid in the tube.

5. A dynamo-electric machine having a stator member and a rotor member, the stator member including a core and windings on the core, a tube containing a vaporizable liquid disposed in close thermal relation with said windings, means for heating the tube in accordance with the current of the machine, the end of said tube extending outside the stator member, and switch means adjacent the end of the tube, said switch means being actuated in response to vaporization of the liquid in the tube to effect deenergization of the machine.

6. A dynamo-electric machine having a stator member and a rotor member, the stator member including a core and windings on the core, the windings having end portions extending beyond the core, a tube containing a vaporizable liquid, said tube extending circumferentially of the machine and engaging the end portions of the windings in close thermal relation, means for heating the tube in accordance with the currents in the windings, the end of said tube extending outside the stator member, and switch means adjacent the end of the tube, said switch means being actuated in response to vaporization of the liquid in the tube to effect deenergization of the machine.

7. A dynamo-electric machine having a stator member and a rotor member, the stator member including a core and windings on the core, bearings for supporting the rotor member, a tube containing a vaporizable liquid disposed in close thermal relation with said windings, means for heating the tube in accordance with the current of the machine, one end of the tube extending into close thermal relation with one of said bearings, and means accessible from the outside of the machine for effecting deenergization of the liquid in response to vaporization of the liquid in the tube.

8. A three-phase dynamo-electric machine having a plurality of phase windings, a tube containing a vaporizable liquid disposed in close thermal relation to said windings, means for heating a portion of said tube in accordance with the current in one of the phase windings, means for heating another portion of the tube in accordance with the current in another of the phase windings, means for heating a third portion of the tube in accordance with the current in a third phase winding, and means for effecting deenergization of the machine in response to vaporization of the liquid in the tube.

9. A three-phase dynamo-electric machine having three phase windings, a conducting tube containing a vaporizable liquid disposed in close thermal relation to said windings, means for connecting the tube to the windings so that one portion of the tube carries the current of one of the phase windings, another portion of the tube carries the current of another of the phase windings, and a third portion of the tube carries the current of the third phase winding, and means for effecting deenergization of the machine in response to vaporization of the liquid in the tube.

10. A three-phase dynamo-electric machine having three phase windings, a conducting tube containing a vaporizable liquid disposed in close thermal relation to said windings, means for electrically connecting one of the phase windings in series with one portion of the tube, means for electrically connecting another of the phase windings in series with another portion of the tube, means for electrically connecting the third phase winding in series with a third portion of the tube, switch means connected to control the energization of the machine, and means for actuating the switch means in response to vaporization of the liquid in the tube.

11. A three-phase dynamo-electric machine having three phase windings, a conducting tube containing a vaporizable liquid disposed in close thermal relation to said windings, said tube having two sections of unequal length insulated from but communicating with each other, connecting means adjacent each end of the shorter section of the tube, connecting means adjacent each end of the longer section of the tube, the length of the tube between the last-mentioned connecting means being substantially twice the length of the tube between the first-mentioned connecting means, connecting means substantially midway between the last-mentioned connecting means, whereby the tube is divided into three substantially equal portions, means for connecting the windings of the machine to said connecting means so that each portion of the tube carries the current of one of the phase windings, and means for effecting deenergization of the machine in response to vaporization of the liquid in the tube.

12. A three-phase dynamo-electric machine having three phase windings, a conducting tube containing a vaporizable liquid disposed in close thermal relation to said windings, said tube having two sections of unequal length insulated from but communicating with each other, connecting means adjacent each end of the shorter section of the tube, connecting means adjacent each end of the longer section of the tube, the length of the tube between the last-mentioned connecting means being substantially twice the length of the tube between the first-mentioned connecting means, connecting means substantially midway between the last-mentioned connecting means, whereby the tube is divided into three substantially equal portions, one of said phase windings being connected to the connecting means adjacent the free end of the shorter section of the tube, the connecting means at the other end of said shorter section being connected to the connecting means midway of the longer section of the tube, the other two phase windings being connected respectively to the connecting means adjacent the ends of said longer section, and means for effecting deenergization of the machine in response to vaporization of the liquid in the tube.

13. A three-phase dynamo-electric machine having three phase windings, a conducting tube containing a vaporizable liquid disposed in close thermal relation to said windings, said tube having two sections of unequal length insulated from but communicating with each other, connecting means adjacent each end of the shorter section of the tube, connecting means adjacent each end of the longer section of the tube, the length of the tube between the last-mentioned connecting means being substantially twice the length of the tube between the first-mentioned connecting means, connecting means substantially midway between the last-mentioned connecting means, whereby the tube is divided into three substantially equal portions, one of said phase windings being connected to the connecting means adjacent the free end of the shorter section of the tube, a second one of the phase windings being connected to the connecting means adjacent one end of the longer section of the tube, the other ends of said phase windings being connected together for connection to a three-phase line, the third phase winding being connected to the connecting means at the other end of the longer section of the tube, the other end of the third phase winding and the other connecting means of the shorter section of the tube being connected together for connection to the line, means for connecting the connecting means midway of the longer section of the tube to the line, and means for effecting deenergization of the machine in response to vaporization of the liquid in the tube.

14. A thermally-responsive protective device comprising an electrically conductive tube, a vaporizable liquid in the tube, a hollow insulator separating the tube into two sections, connecting means on the tube for connecting the sections of the tube to the windings of an electric motor, and bellows means at one end of the tube actuated by vaporization of the liquid in the tube.

15. A thermally-responsive protective device comprising an electrically conductive tube, a vaporizable liquid in the tube, a hollow insulator separating the tube into two unequal sections, connecting means adjacent each end of the shorter section of the tube, connecting means adjacent each end of the longer section of the tube, the length of the tube between the last-mentioned connecting means being substantially twice the length of the tube between the first-mentioned connecting means, connecting means substantially midway between the last-mentioned connecting means, whereby the tube is divided into three substantially equal portions, and bellows means at one end of the tube actuated by vaporization of the liquid in the tube.

References Cited in the file of this patent

UNITED STATES PATENTS

| 1,676,923 | Phelan et al. | Dec. 10, 1912 |
| 2,471,840 | Seely | May 31, 1949 |